United States Patent
Rowell

(10) Patent No.: US 7,114,331 B1
(45) Date of Patent: Oct. 3, 2006

(54) PUMP DRIVE SHAFT WITH INTERNAL FLOW TUBE AND METHOD OF INSTALLATION

(75) Inventor: Brian G. Rowell, Saxtons River, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 742 days.

(21) Appl. No.: 10/453,075

(22) Filed: Jun. 2, 2003

Related U.S. Application Data

(60) Provisional application No. 60/391,956, filed on Jun. 27, 2002.

(51) Int. Cl.
*F16D 33/00* (2006.01)

(52) U.S. Cl. .......................................... 60/330; 60/358
(58) Field of Classification Search .................. 60/330, 60/358; 138/111, 114, 116
See application file for complete search history.

(56) References Cited

U.S. PATENT DOCUMENTS 4,177,694 A * 12/1979 Lachaize ...................... 475/69

* cited by examiner

*Primary Examiner*—Edward K. Look
*Assistant Examiner*—Michael Leslie
(74) *Attorney, Agent, or Firm*—Clifford F. Rey

(57) ABSTRACT

A pump drive shaft for an automatic transaxle wherein the cross-sectional profile of the internal flow tube has been modified to a non-cylindrical configuration to increase the flow of transmission fluid through the pump drive shaft from the torque converter. A selected surface of the non-cylindrical tube is positioned at a predetermined angular orientation within the pump drive shaft to provide increased radial clearance between the flow tube and the fluid inlets/outlets to increase the flow of transmission fluid from the torque converter. In various embodiments the flow tube is elliptical, rectangular, bi-lobular in cross-section or a variation thereof, which produces an axially extending fluid passage between the flow tube and the fluid inlets/outlets having an increased cross-sectional and flow capacity from the torque converter. The present disclosure also sets forth a method of installing the present internal flow tube within the pump drive shaft.

25 Claims, 6 Drawing Sheets

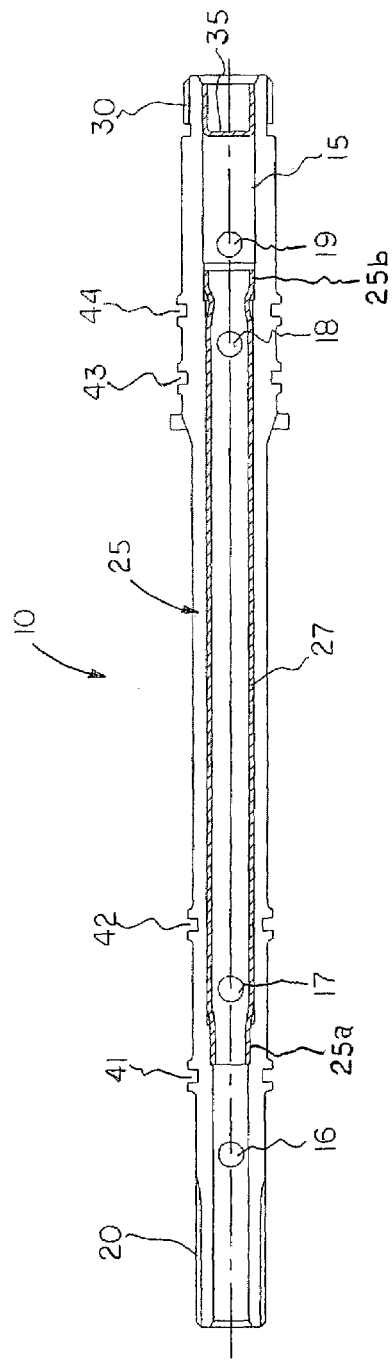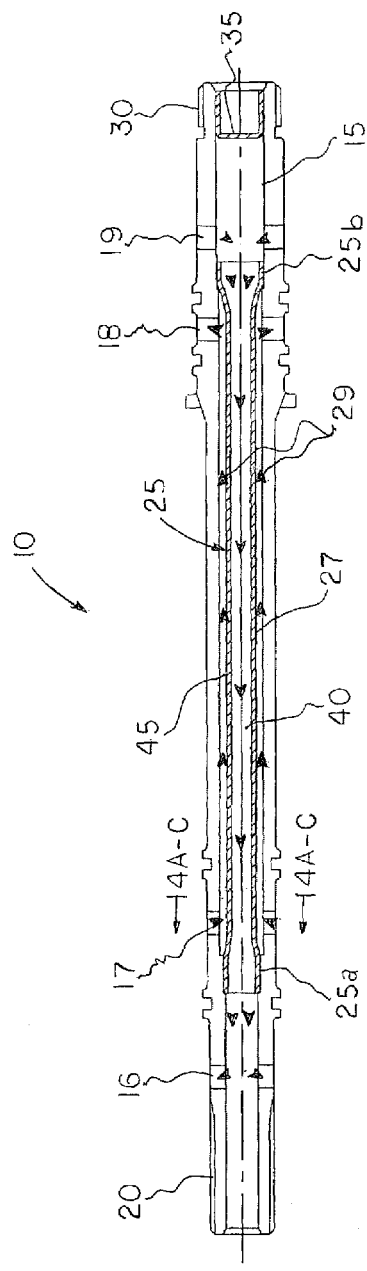
FIG. 3A
FIG. 3B

PUMP DRIVE SHAFT WITH INTERNAL FLOW TUBE AND METHOD OF INSTALLATION

CROSS-REFERENCE TO RELATED APPLICATION

This application claims the benefit under 35 U.S.C. § 119(e) of U.S. Provisional Patent Application No. 60/391,956 filed Jun. 27, 2002, entitled Pump Drive Shaft With Internal Flow Tube.

BACKGROUND OF INVENTION

The present invention relates generally to the field of automatic transmission hydraulic systems and, more particularly, to an improved pump shaft for the Ford AX4S, AXODE, and AXOD transaxles and other similar transmissions.

The Ford AX4S transaxle has a variable displacement pump that supplies fluid under pressure to the hydraulic system. In the Ford transaxle the torque converter cover assembly drives the impeller blades and rotates a pump drive shaft that operates the pump. It contains hydraulic fluid and provides a mating surface for the Torque Converter Clutch (TCC) piston and damper assembly. The turbine is driven by fluid from the impeller and transmits power to the chain drive and planetary gear sets. The reactor or stator component redirects fluid flow returned from the turbine to the impeller so that it rotates in the same direction as the impeller, which assists in torque multiplication.

The original equipment manufacture (hereinafter "OEM") pump drive shaft includes fluid passages extending through the shaft and through an internal flow tube installed therein, which transmit automatic transmission fluid (hereinafter "ATF") to the TCC piston to release the torque converter clutch. The internal ATF flow tube installed within the pump drive shaft defines an axial fluid passage between the flow tube and the pump shaft bore, which forms part of the turbine fluid circuit and carries ATF flow from the torque converter.

A problem in the Ford AX4S transaxle arises when this axial fluid passage becomes even partially restricted with particulate debris upsetting the balance of ATF flow through the torque converter. The lack of adequate ATF flow may cause delayed engagement, converter shudder, overheating, and lock up problems. Thus, the present invention has been developed to resolve this problem and other shortcomings of the prior art.

SUMMARY OF THE INVENTION

Accordingly, the present invention is a pump drive shaft wherein the cross-sectional profile of the internal flow tube has been modified to a non-cylindrical configuration to increase the flow of ATF through the pump drive shaft from the torque converter. In alternative embodiments the present flow tube is either elliptical, rectangular, or bi-lobular in cross-section (or variations thereof), which provides increased radial clearance between the outer diameter of the flow tube and the shaft bore. The flow tube is positioned at a predetermined angular orientation to the ATF inlets/outlets formed in the shaft to increase the cross-sectional area of the axial fluid passage. The present invention also discloses a method of installing the modified ATF flow tube within the pump drive shaft.

Further, dimensional changes to the annular seal grooves formed on the exterior of the shaft have been implemented to provide improved sealing of the Teflon® seals installed therein with the mating turbine shaft, which is radially disposed about the pump drive shaft. The seal grooves have been modified in both width and depth to provide better lift and sealing characteristics.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

FIG. 3A is a longitudinal cross-section of the pump drive shaft of the present invention showing the orientation of the modified flow tube to the ATF inlet/outlet ports;

FIG. 3B is a longitudinal cross-section of the pump drive shaft of FIG. 3A shown rotated 90 degrees axially from the position shown in FIG. 3A;

DETAILED DESCRIPTION OF THE PREFERRED EMBODIMENTS

Figure 1:
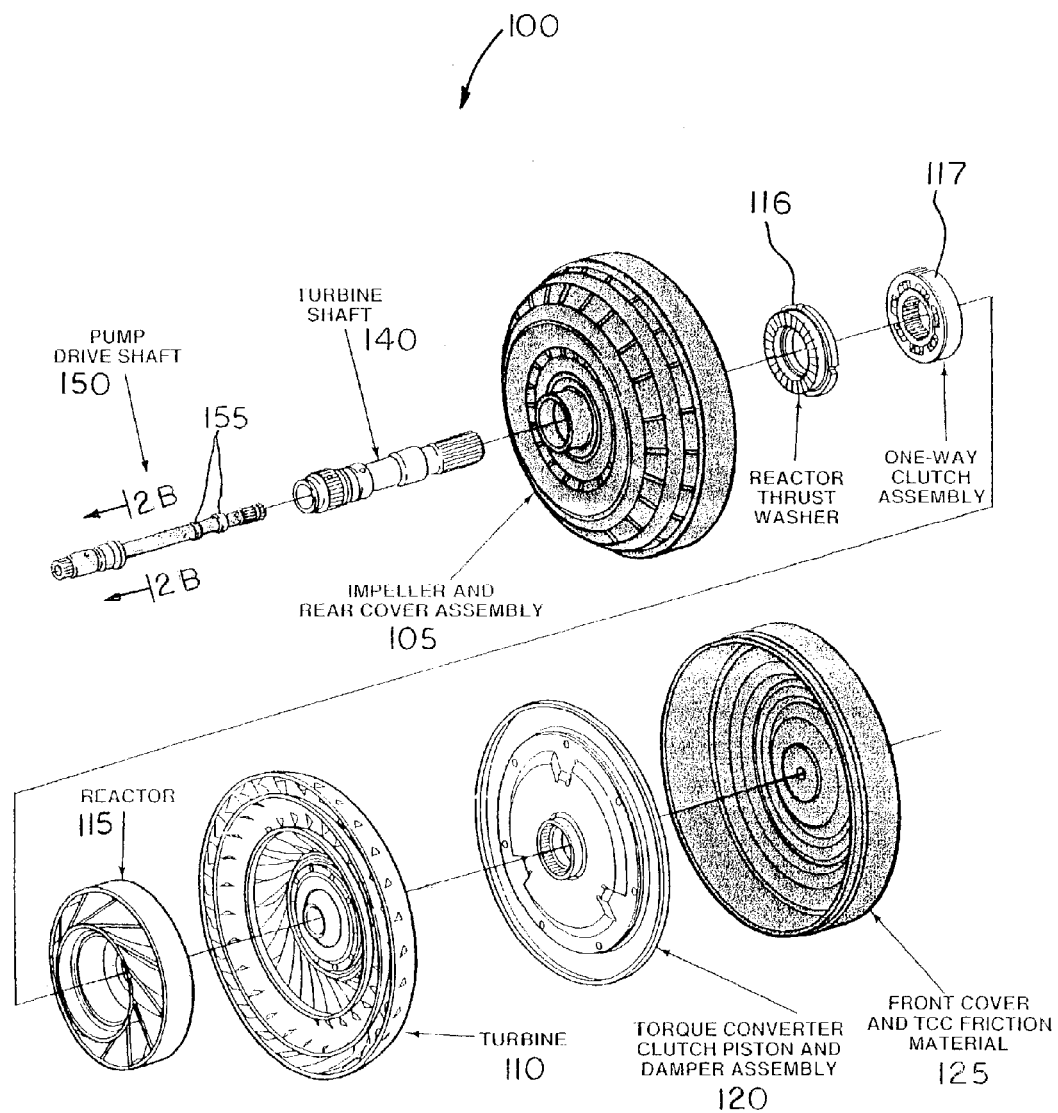
FIG. 1 is an exploded perspective view of the components of the torque converter assembly of the Ford AX4S transaxle showing the location of the pump drive shaft and is labeled Prior Art.

With further reference to the drawings, there is shown therein an exploded view of the Ford AX4S transaxle torque converter wherein the present invention is utilized, indicated generally at 100 and illustrated in FIG. 1. The AX4S torque converter is a multi-element assembly containing an impeller and cover assembly, indicated generally at 105, a turbine, indicated generally at 110, a reactor assembly, indicated generally at 115 including a reactor thrust washer 116 and a one-way clutch assembly 117, a Torque Converter Clutch (TCC) piston and damper assembly, indicated generally at 120, and a front cover including TCC friction material, indicated generally at 125.

The pump drive shaft, indicated generally at 150, is disposed within the turbine shaft, indicated generally at 140, in coaxial relation thereto. A forward end of pump shaft 150 engages the front cover 125, which turns at engine speed. The rearward end of the shaft 150 engages and drives the hydraulic pump (not shown).

Figure 2A:
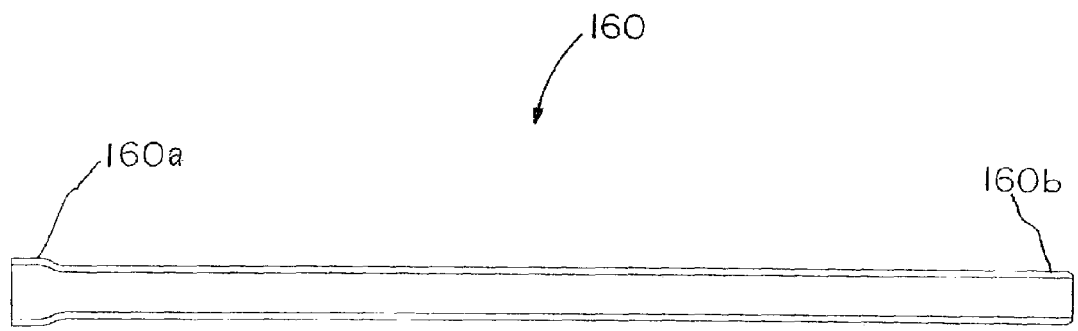
FIG. 2A is a longitudinal cross-section of the internal flow tube that is installed within the pump drive shaft and is labeled Prior Art.
Figure 2B:
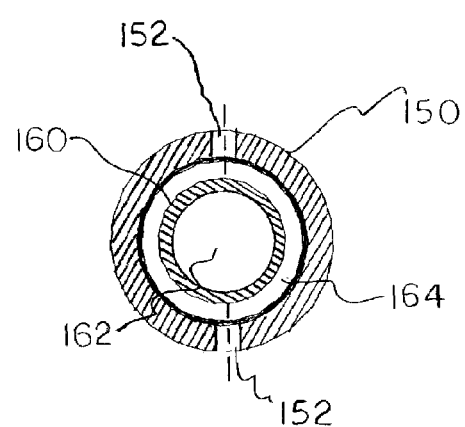
FIG. 2B is a cross-sectional view taken along the section line 2B—2B of FIG. 1 showing the flow tube within the pump drive shaft and is labeled Prior Art.

As shown in FIG. 2A, the OEM pump shaft 150 is provided with an elongated, cylindrical flow tube, indicated generally at 160, which is installed within the inside diameter (hereinafter "I.D.") of the pump shaft 150 at a predetermined axial location. The flow tube 160 is a thin-walled, cylindrical construction, which is flared at a distal end 160a thereof and dimensioned at an opposite end 160b to provide an interference fit with the I.D. of the pump shaft 150. Once installed, the flow tube 160 functions to transmit fluid pressure axially through the I.D. 162 (FIG. 2B) of the flow tube to release the TCC piston from the front cover 125 when converter lock up is not required.

In addition, the flow tube 160 also carries ATF away from the turbine 110 within the axially extending fluid passage as at 164 between the outside diameter (hereinafter "O.D.") of the flow tube 160 and the inside diameter of the pump shaft 150 via ATF ports as at 152.

A chronic problem in the Ford AXODE transaxle results from a partial restriction and/or blockage of ATF flow within the aforementioned passage 164. In the OEM design this passage 164 is only 1 mm in depth when measured radially and is prone to the accumulation of particulate debris and ATF residue, which is a by-product of normal operation. Further, because the flow tube 150 is relatively difficult to remove and clean, it is often neglected by service technicians even during major transaxle service and overhaul. Thus, the present invention has been developed to resolve this problem and will now be described.

Referring to FIGS. 3A and 3B there is shown therein an improved pump drive shaft in accordance with the present invention, indicated generally at 10. The pump shaft 10 is an elongated, cylindrical construction having a central bore 15 formed along the longitudinal axis thereof. The central bore 15 is formed in fluid communication with a plurality of ATF inlet/outlet ports 16, 17, 18, and 19 extending through the shaft 10, which deliver ATF to and carry ATF away from the torque converter. It will be appreciated that in the present shaft assembly 10, the ATF ports 16–19 are machined to predetermined dimensions to accurately meter the flow of ATF based on the lubrication requirements of the assembled components. At its forward end the pump shaft 10 includes an external spline 20 for mating engagement with an internal spline formed in the front cover 125 of the torque converter.

A rearward end of the shaft 10 includes a crowned external spline 30 for mating engagement with an internal spline formed in the hydraulic pump (not shown). The crowned spline 30 is advantageous in that it allows limited radial movement of the shaft 10 during operation and reduces wear on the internal surfaces of the pump in comparison to the standard spline provided on the OEM shaft 150. The rearward end of the shaft 10 also includes an end plug 35, which is installed in the rearward end of the pump shaft 150 to maintain fluid pressure and to divert ATF flow to the release side of TCC piston via port 19.

Figure 4A:
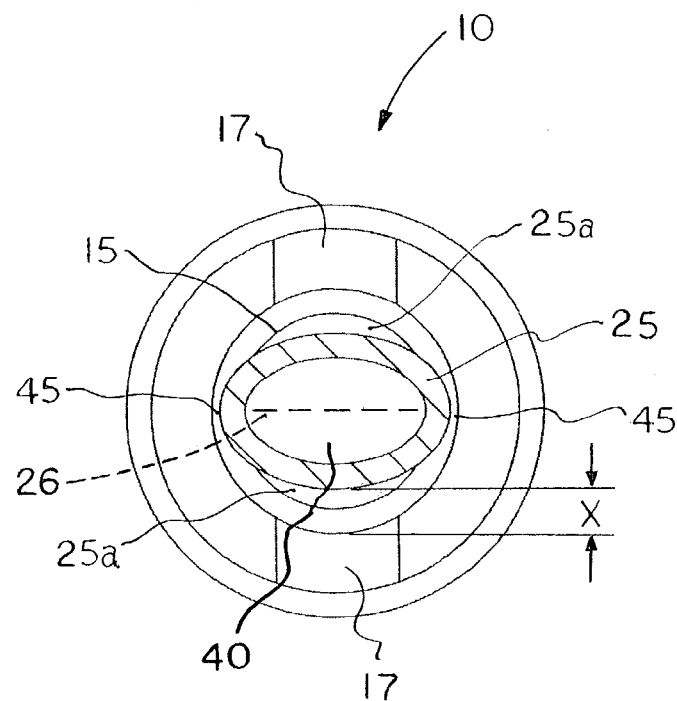
FIG. 4A is a cross-sectional view of one embodiment of the present pump drive shaft showing the orientation of an elliptical flow tube.

In one embodiment of the present shaft 10, a non-cylindrical flow tube, indicated generally at 25, is provided in which the body member 27 is elliptical in cross-section as most clearly shown in FIG. 4A. The flow tube 25 is formed from steel tubing material and is formed into the generally elliptical shape illustrated using conventional sheet metal working equipment and techniques. Both the forward end 25a and the rearward end 25b of the flow tube 25 are flared to predetermined dimensions to provide an interference fit with the mating I.D. surfaces of the bore 15 to prevent leakage between the TCC release circuit as at 40 and that part of the turbine return circuit defined by the axial passage as at 45. The direction of flow within these hydraulic circuits is indicated by directional arrows 29 (FIG. 3B).

Referring to FIG. 4A the flow tube 25 is angularly oriented within the shaft assembly 10 such that the greater longitudinal plane 26 (denoted by broken line) of the ellipse is positioned in perpendicular relation to the ATF inlet/outlet ports 17, 18 to provide increased radial clearance between the O.D. of the flow tube 25 and the bore 15 of the shaft as indicated by dimension "X" in FIG. 4A. Thus, an increase in ATF flow between ATF ports 17, 18 is achieved on either side of the elliptical flow tube 25 corresponding to the increased radial clearance denoted by dimension "X".

Still referring to FIG. 4A it will be noted that the radial clearance between the O.D. of the flow tube 25 and the ends of the ellipse (i.e. portions defined by the smallest radius) have been slightly decreased. However, flow testing of the present pump drive shaft 10 has demonstrated an overall increase in ATF flow between ATF inlet/outlet ports 17, 18 with no detrimental effects in the turbine return circuit 45 resulting from modification of the flow tube 25. Further, the change in the cross-section of the present flow tube 25 to an elliptical shape has no appreciable effect on the flow of ATF through the interior of the flow tube 25.

Figure 4B:
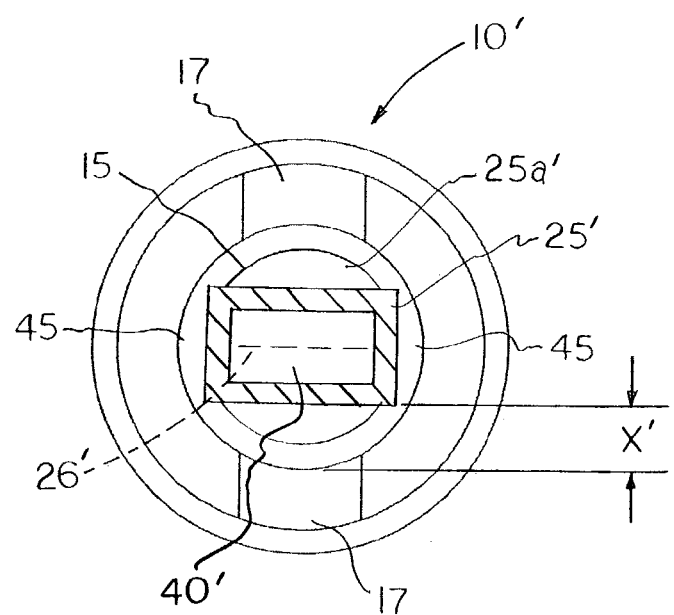
FIG. 4B is a cross-sectional view of another embodiment of the present pump drive shaft showing the orientation of a rectangular flow tube.

In an alternative embodiment shown in FIG. 4B, a modified flow tube 25', is provided in which the body 27 thereof is generally rectangular in cross-section defining a generally rectangular interior passage or circuit 40'. As in the embodiment shown in FIG. 4A, the flow tube 25' is angularly oriented within the shaft assembly 10' such that the greater longitudinal plane 26' (denoted by broken line) of the rectangle is positioned in perpendicular relation to the axis of the ATF inlet/outlet ports 17, 18 to provide increased radial clearance between the external sides of the rectangular flow tube 25' and the bore 15 of the shaft as indicated by dimension "X" in FIG. 4B. Thus, an increase in ATF flow between ATF ports 17, 18 is similarly achieved on either side of the rectangular flow tube 25' corresponding with the increased radial clearance denoted by dimension "X'".

Figure 4C:
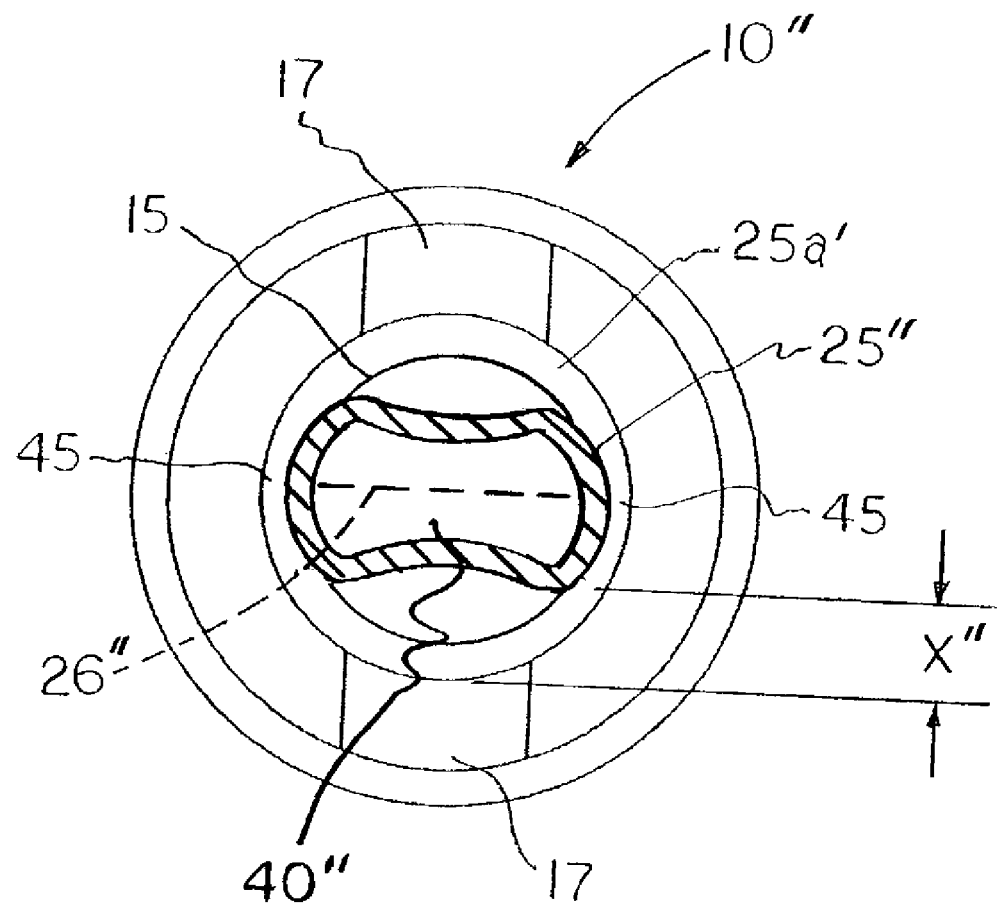
FIG. 4C is a cross-sectional view of yet another embodiment of the present pump drive shaft showing the orientation of a bi-lobular flow tube.

In yet another alternative embodiment shown in FIG. 4C, a modified flow tube 25", is provided in which the body 27 thereof is a symmetrical, bi-lobular construction. More particularly, the body portion is configured (i.e. in cross-section) of vertically opposed, concave surfaces on the lateral sides and horizontally opposed, convex surfaces on the ends defining a bi-lobular passage or circuit 40". As shown in the previous embodiments (FIGS. 4A–4B) the flow tube 25" is angularly oriented within the shaft assembly 10" such that the greater longitudinal plane 26" (denoted by broken line) of the bi-lobular flow tube 25" is positioned in perpendicular relation to the axes of the ATF inlet/outlet ports 17, 18 to provide increased radial clearance between the external surface of the flow tube 25" and the bore 15 of the shaft as indicated by dimension "X'"" in FIG. 4C. Thus, an increase in ATF flow between ATF ports 17, 18 is similarly achieved on either concave side of the bi-lobular flow tube 25" corresponding with the increased radial clearance denoted by dimension "X'"".

It will be understood that other alternative constructions of the internal flow tube may be devised with minor variation of the aforementioned examples. Such alternative constructions are considered to be within the scope of the present invention.

Figure 5:
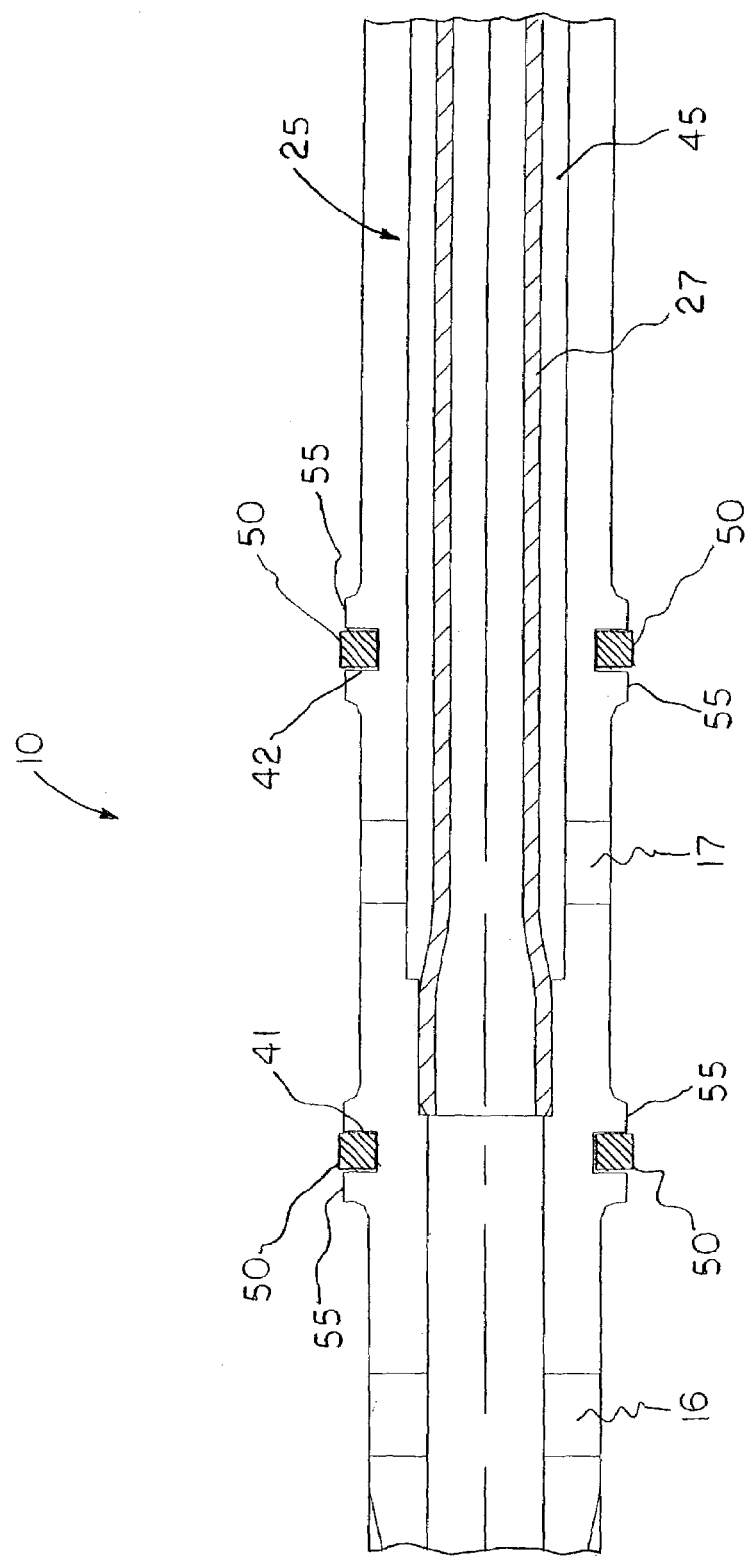
FIG. 5 is an enlarged partial cross-section of the present pump drive shaft.

In addition to the aforementioned improvements, the present pump drive shaft 10 also includes modifications to the annular seal grooves 41, 42, 43, 44 (FIG. 5). More particularly, the present seal grooves 41–44 have been modified in both width and depth to provide better lift to the Teflon® seals 50 installed therein. The OEM seal grooves (not illustrated) have 0.035" clearance between the sidewalls of the grooves and the Teflon® seals. Further, in the OEM design the O.D. of the shaft 10 on either side of the grooves 155 (i.e. groove lands) shown in FIG. 1 can cause damage (i.e. galling) to the mating bores of the turbine shaft 140 in operation if the Teflon® seals do not lift properly or after the seals wear during operation.

In the present invention the clearance between the groove lands 55 (FIG. 5) and the mating bores (not shown) of the turbine shaft 140 is designed to be greater than the clearance between the seal I.D. and the groove diameters. Thus, if the shaft 10 is forced to an eccentric position in relation to the turbine shaft 140, the groove lands 55 are prevented from contacting and/or galling the bore.

In order to install or retrofit the present flow tube 25 or 25' within the pump drive shaft, the end plug 35 and OEM flow tube 160 are initially removed. Next, a flow tube 25, 25' or 25" is rotated into position to obtain the desired angular orientation of the profile of the tube (FIGS. 4A–4C) to the fluid ports 17, 18. It can be seen that the greater longitudinal plane (denoted by broken line) of the flow tube 25, 25' or 25" is preferably perpendicular to the axis of ports 17, 18. A sealant such as Loctite® or other sealant may be applied to the flared ends of the flow tube 25 to ensure against leakage. Next, the replacement flow tube 25 or 25' is pressed into the bore 15 from the rearward end of the pump shaft 10 to the position shown in FIGS. 3A and 3B using a suitable tool. Thereafter, the end plug 35 is installed in the forward end of the shaft 10 to complete the installation.

Although not specifically illustrated in the drawings, it should be understood that additional equipment and structural components will be provided as necessary and that all of the components described above are arranged and supported in an appropriate fashion to form a complete and operative Pump Drive Shaft with Internal Flow Tube incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A pump drive shaft assembly for an automatic transaxle comprising:
   a cylindrical pump drive shaft having a longitudinal bore and a plurality of fluid ports having longitudinal axes, said fluid ports extending through said shaft in fluid communication with said bore;
   an internal flow tube having a non-cylindrical configuration, wherein said flow tube is installed within said bore of said pump drive shaft to form an axially extending fluid passage between an outside surface of said flow tube and said bore, said passage being disposed in fluid communication with said fluid ports such that hydraulic fluid flows through said passage independently of hydraulic fluid flowing within said flow tube; and
   an end plug installed in the rearward end of said pump drive shaft.

2. A pump drive shaft assembly of claim 1 wherein said flow tube is generally elliptical in cross-section.

3. A pump drive shaft assembly of claim 2 wherein said flow tube is positioned at a predetermined angle to said fluid ports such that said passage is disposed in proximity thereto providing an increased cross-sectional area and fluid capacity within said passage.

4. A pump drive shaft assembly of claim 3 wherein a greater longitudinal plane of said flow tube is disposed in perpendicular relation to said longitudinal axes of said fluid ports providing a maximum cross-sectional area and fluid capacity within said passage.

5. A pump drive shaft assembly of claim 1 wherein said flow tube is generally rectangular in cross-section.

6. A pump drive shaft assembly of claim 5 wherein said flow tube is positioned at a predetermined angle to said fluid ports such that said passage is disposed in proximity thereto providing an increased cross-sectional area and fluid capacity within said passage.

7. A pump drive shaft assembly of claims 6 wherein a greater longitudinal plane of said flow tube is disposed in perpendicular relation to said longitudinal axes of said fluid ports providing a maximum cross-sectional area and fluid capacity within said passage.

8. A pump drive shaft assembly of claim 1 wherein said flow tube is generally bi-lobular in cross-section.

9. A pump drive shaft assembly of claim 8 wherein said flow tube is positioned at a predetermined angle to said fluid ports such that said passage is disposed in proximity thereto providing an increased cross-sectional area and fluid capacity within said passage.

10. A pump drive shaft assembly of claims 9 wherein a greater longitudinal plane of said flow tube is disposed in perpendicular relation to said longitudinal axes of said fluid ports providing a maximum cross-sectional area and fluid capacity within said passage.

11. A method of increasing hydraulic fluid flow within a pump drive shaft of an automatic transaxle, said pump drive shaft having an internal flow tube therein forming an axial fluid passage between an outside surface of said flow tube and a longitudinal bore of said pump drive shaft, said axial fluid passage being disposed in fluid communication with a plurality of fluid ports having longitudinal axes and formed within said pump drive shaft such that hydraulic fluid flows through said axial fluid passage and around said flow tube independently of hydraulic fluid flowing within said flow tube, said method comprising the steps of:
    providing a replacement flow tube having a non-cylindrical cross-section;
    inserting said replacement flow tube within said longitudinal bore of said pump drive shaft such that a modified axial fluid passage is created between said flow tube and said longitudinal bore; and
    positioning said replacement flow tube in predetermined angular relation to said fluid ports such that said modified axial fluid passage is disposed in proximity to said fluid ports providing increased fluid capacity therein.

12. The method of claim 11 wherein the step of positioning further includes the step of:
    orienting a greater longitudinal plane of said replacement flow tube in perpendicular relation to said longitudinal axes of said fluid ports.

13. The method of claim 11 wherein the step of providing further includes the step of:
fabricating said replacement flow tube to include an elliptical cross-section.

14. The method of claim 11 wherein the step of providing further includes the step of:
forming said replacement flow tube to include a rectangular cross-section.

15. The method of claim 11 wherein the step of providing further includes the step of:
constructing said replacement flow tube to include a bi-lobular cross-section.

16. An improved pump drive shaft assembly for an automatic transaxle including a cylindrical pump drive shaft having a longitudinal bore and a plurality of fluid ports extending through said shaft in fluid communication with said bore, wherein the improvement comprises:
an internal flow tube having a non-cylindrical cross-section installed within said pump drive shaft forming an axial fluid passage between an outside surface of said flow tube and said longitudinal bore, said axial fluid passage being disposed in fluid communication with a plurality of said fluid ports such that hydraulic fluid flows through said axial fluid passage and around said flow tube independently of hydraulic fluid flowing within said flow tube.

17. The improved pump drive shaft assembly of claim 16 wherein said flow tube is generally elliptical in cross-section.

18. The improved pump drive shaft assembly of claim 17 wherein said flow tube is installed within said shaft such that said passage is aligned with said fluid ports generating increased fluid capacity within said passage.

19. The improved pump drive shaft assembly of claim 18 wherein a greater longitudinal plane of said flow tube is disposed in perpendicular relation to said longitudinal axes of said fluid ports generating a maximum fluid capacity within said passage.

20. The improved pump drive shaft assembly of claim 16 wherein said flow tube is generally rectangular in cross-section.

21. The improved pump drive shaft assembly of claim 20 wherein said flow tube is installed within said shaft such that said passage is aligned with said fluid ports generating increased fluid capacity within said passage.

22. The improved pump drive shaft assembly of claim 21 wherein a greater longitudinal plane of said flow tube is disposed in perpendicular relation to said longitudinal axes of said fluid ports generating a maximum fluid capacity within said passage.

23. The improved pump drive shaft assembly of claim 16 wherein said flow tube is bi-lobular in cross-section.

24. The improved pump drive shaft assembly of claim 23 wherein said flow tube is installed within said shaft such that said passage is aligned with said fluid ports generating increased fluid capacity within said passage.

25. The improved pump drive shaft assembly of claims 24 wherein a greater longitudinal plane of said flow tube is disposed in perpendicular relation to said longitudinal axes of said fluid ports generating a maximum fluid capacity within said passage.

* * * * *